Sept. 25, 1962
M. K. KAUSCHE
3,055,692
IRRIGATION PIPE CARRIER
Filed Nov. 7, 1960
2 Sheets-Sheet 2

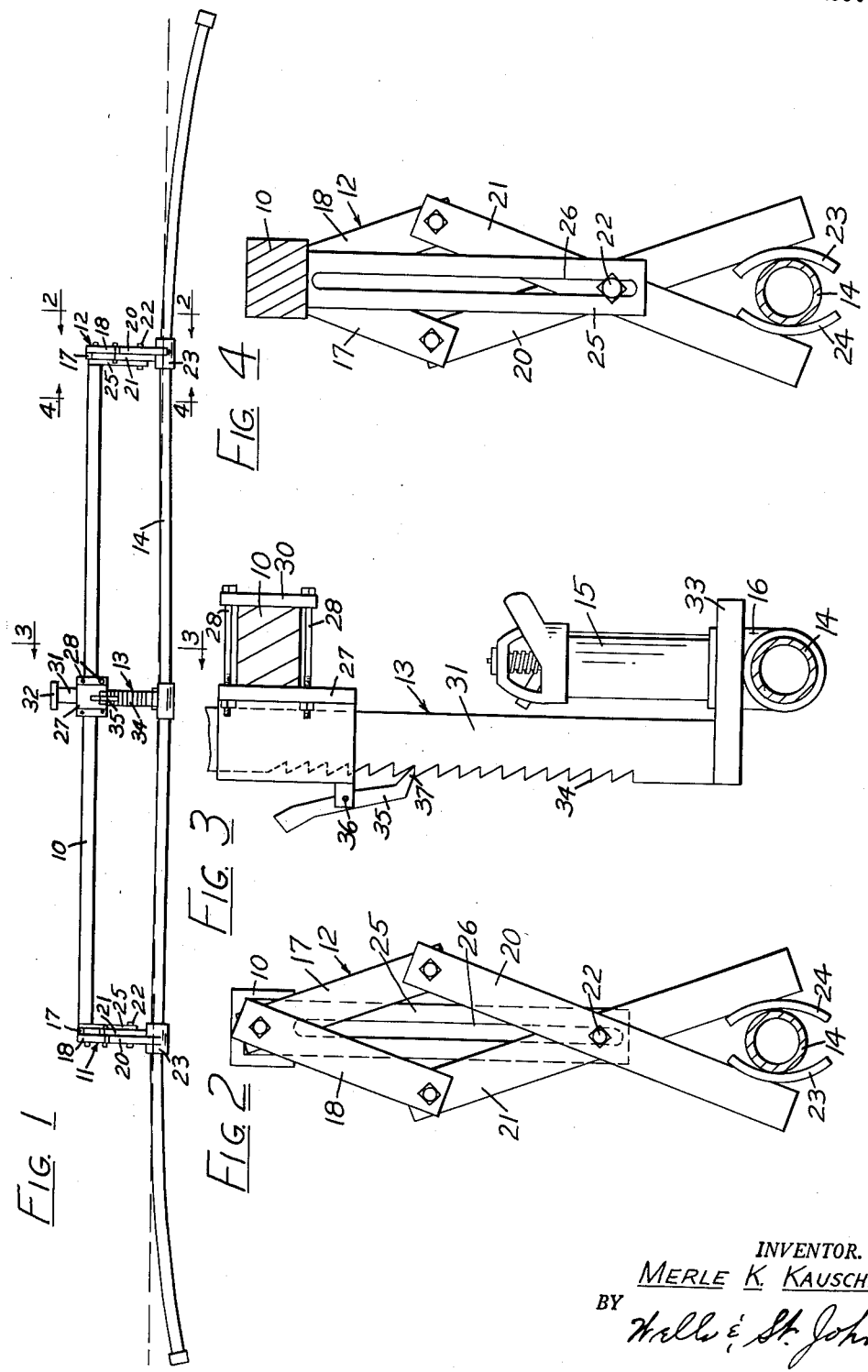

INVENTOR.
MERLE K. KAUSCHE
BY
Wells & St. John
ATTYS.

United States Patent Office 3,055,692
Patented Sept. 25, 1962

3,055,692
IRRIGATION PIPE CARRIER
Merle K. Kausche, 1432 Francis St., Walla Walla, Wash.
Filed Nov. 7, 1960, Ser. No. 67,649
1 Claim. (Cl. 294—16)

This invention relates to an irrigation pipe carrier of the type needed to carry a length of irrigation pipe having an intermediate vertical sprinkler standard.

It is the first object of this invention to provide a manual carrier to facilitate the lifting of long lengths of irrigation pipe in the field. Such pipe normally is used in lengths of 30 to 40 feet and, although made of light weight materials, is extremely difficult to carry due to the bending forces involved in such a length of pipe. According to this invention a pipe can be carried by a single person using a long carrier extending over the pipe and having a pair of tongs at each end of the pipe to grip the sides thereof and a brace at the center of the carrier adapted to limit vertical motion of the central area of the pipe being carried.

It is a further object of this invention to provide a pipe carrier which is easily manageable by one person and which can adapt itself readily to various diameters of pipe and to various lengths of pipe. The invention is not restricted to any particular type of pipe but is particularly adaptable to modern light weight aluminum irrigation pipe commonly used in agricultural applications.

Other obvious objects will be evident from a study of the following description and the accompanying drawings which show one preferred form of the invention, with several minor modifications which may be added to it. This preferred form is not intended to limit the scope of the invention which is amply defined only in the annexed claim.

In the drawings:

FIGURE 1 is an overall elevational view of the pipe carrier showing the manner by which the pipe is held thereby;

FIGURE 2 is an enlarged sectional view of one tong arrangement taken along line 2—2 in FIGURE 1;

FIGURE 3 is a sectional view taken along line 3—3 in FIGURE 1 showing the manner by which the sprinkler standard is vertically braced by the carrier;

FIGURE 4 is a sectional view taken along line 4—4 in FIGURE 1 showing the slide support for the tongs;

Figure 5:
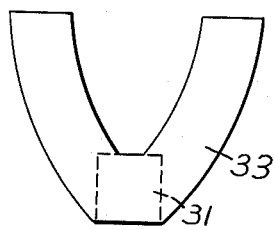
FIGURE 5 is a bottom view of the central brace of the carrier on an enlarged scale shown without the pipe being in place.
Figure 6:
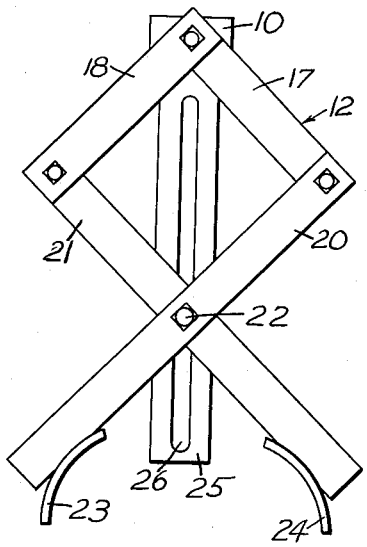
FIGURE 6 is an end view of one of the tongs in FIGURE 1 showing the tong in relaxed position with no pipe in place.

Referring now to the drawings and to FIGURE 1 in particular the carrier shown consists of a central support bar designated as 10 having at each end thereof a tong arrangement, generally designated as 11 and 12 respectively, and also having at its central position a brace arrangement generally designated by the numeral 13. Since the two tong arrangements 11 and 12 are identical or mirror images of one another the same numerals will be used to designate corresponding parts of each. According to the first embodiment shown in FIGURES 1–6 the length of the support bar 10 should be less than the one half length of the pipe being carried. In normal practice the length of the piece of irrigation pipe generally designated by the numeral 14 would be between 30 and 40 feet with a central sprinkler standard 15 fixed to pipe 14 by means of a T-joint 16. The material commonly used today for such irrigation pipe is aluminum, which produces a light weight and economical pipe, but also one subject to a high tendency to bend when lifted. The pipe 14 is commonly moved in sections such as shown in FIGURE 1 and adjacent sections are coupled to one another to complete a field arrangement. The support bar 10 and the carrier arrangement shown in FIGURE 1 are designed to facilitate manual movement of the pipe 14 by single person without the necessity of mechanical adjustment or complicated mechanisms. Support bar 10 may be of any desired configuration, such as a rectangular section or an I-beam shape.

At each end of support bar 10 is located one of the tong arrangements 11 or 12. Each of these arrangements consists of a first link 17 and a second link 18, both of which are pivoted to the ends of the support bar 10. The remaining ends of links 17 and 18 are pivoted to the upper ends of a third link 20 and a fourth link 21 respectively. The links 17, 18, 20 and 21 are offset from one another to produce a uniform tong configuration. The two links 20 and 21 are pivoted to one another by means of a bolt 22 at their central area. The remaining ends of links 20 and 21 are provided with suitable gripping elements 23, 24, respectively, which are of any desired design adapted to grip the sides of the irrigation pipe 14. Intermediate the first link 17 and the end of support bar 10 is a slide support 25, which is merely a slotted piece of metal extending perpendicularly to support bar 10. The slide support 25 is provided with a longitudinal slot 26 which slidably receives the pivot bolts 22 of the respective tong arrangement. The purpose of the slide support 25 is to limit the movement of the pivot bolt 22 to straight line motion perpendicular to the length of support bar 10. This arrangement insures that both tong arrangements 11 and 12 will remain in parallel planes perpendicular to the support bar 10. In this way the tong arrangements 11 and 12 can be easily controlled from a central position along the support bar 10.

At the center of support bar 10 is provided a mounting bracket 27 which is fixed thereto by means of four bolts 28 and a backing plate 30. The mounting bracket 27 is provided with a square vertical aperture having an axis adjacent to and perpendicular to the longitudinal axis of support bar 10. This aperture slidably receives a slide member 31 which extends from the support bar 10 in a direction parallel to the tong arrangements 11 and 12. The upper end of slide member 31 is capped by a cross handle 32. The lower end of slide member 31 is provided with a horizontal yoke 33 adapted to straddle the central portion of the T-joint 16. One surface of the slide member 31 is provided with a rack 34 having teeth which are slanted upwardly. Pivoted on the mounting bracket 27 is a pawl 35 which is mounted for pivotal motion about a horizontal pin 36. Thus the pawl 35 is moveable in a vertical plane and has a pointed end 37 which is adapted to engage the rack 34. Thus it appears obvious that when the pawl 35 is engaged with rack 34 that the slide member 31 will be prevented from moving upwardly with respect to the support bar 10.

In operation, one desiring to move a length of irrigation pipe such as 14 will first disconnect each end of the pipe by the usual coupling devices and will then locate the support bar 10 centrally with respect to the irrigation pipe 14. This can be easily accomplished by simply fitting the yoke 33 about the central portion of T-joint 16 which supports the central sprinkler system standard 15. Then each tong arrangement 11 and 12 is positioned to straddle the sides of the irrigation pipe 14. The position of yoke 33 with respect to the support bar 10 should be such that when the tong arrangement 11 and 12 grips the pipe 14 the pipe 14 will bow slightly at its central area and push upwardly against the yoke 33. This can be seen in FIGURE 1 where the dashed line 38 designates the normal central axis of pipe 14. The correct position of slide member 31 is easily adjusted manually by operation of pawl 35. Once pawl 35 is set with tooth 37 in engagement with rack 34 no further movement of yoke 33 toward support bar 10 is possible. Thus when the support bar is lifted by the person desiring to move pipe 14 the tong arrangements 11 and 12 will grip the sides of the pipe 14 due to their own weight and the pipe 14 will be lifted at these two points. The overhanging lengths of excess pipe at each end of support bar 10 will tend to force the central area of pipe 14 upwardly. The force is used to push upwardly against slide member 31 which is laterally positioned upon the pipe 14 by yoke 33. This upward pressure of the pipe 14 and T-joint 16 against yoke 33 is resisted by pawl 35 and is used to hold the pipe 14 with respect to the carrier. Thus the pipe 14 with its overhanging ends will be securely gripped by its very weight when the support bar 10 is lifted by a single person at its central area. The pipe 14 can then be moved to the new area desired and when laid on the ground will be released by the tongs 11 and 12 and can then be used as desired.

Figure 7:
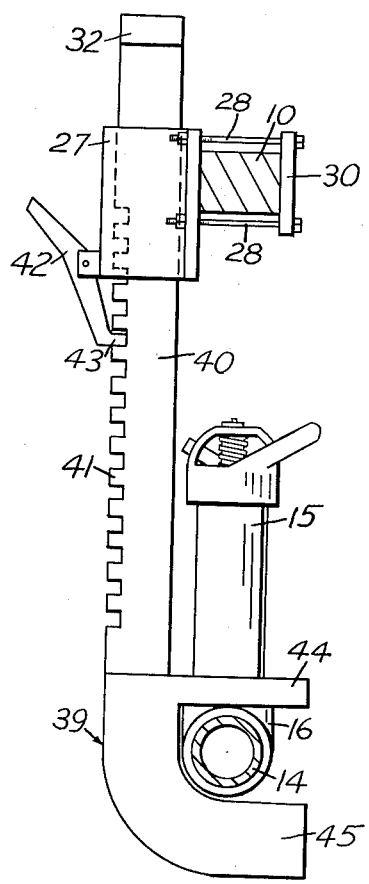
FIGURE 7 is a sectional view through the line 2—2 in FIGURE 1 but showing a second modified form of the yoke used on the central brace.

In FIGURE 7 is shown a slight modification of the central brace arrangement 13. In this arrangement the mounting bracket 27 is identical to that previously described with respect to FIGURES 1–6. The slide member 40 is provided with square rack teeth 41 and the pivoted pawl 42 is provided with a square tooth engaging point 43. The point 43 is adapted to fit between the rack teeth 41. At the bottom end of the modified slide member 40 is a modified yoke element generally designated by the numeral 39. The yoke element 39 has an upper yoke 44 as before and further has lower fingers 45 which are curved to fit around the bottom of T-joint 16. Thus the yoke member 39 in this case is designed to prevent vertical movement of the T-joint 16 in either vertical direction.

The main difference between this new embodiment and that previously described is that the length of the support bar 10 may be greater than one-half the length of the pipe 14 being carried. This is due to the fact that the modified yoke 39 prevents the T-joint 16 from moving vertically in either direction and thus can support the weight of the central area of pipe which will then bear downwardly against the curved fingers 45. This downward movement will be prevented by the pawl 42 which has its point 43 engaged with the rack teeth 41 on this modified slide member 40. Thus this second embodiment of the invention, although used identically to the first one, has a wider range of use where various lengths of irrigation pipe will be carried.

Obviously only two of many different variations of this invention have been shown. Other modifications will be obvious to one skilled in this art in view of the above disclosure. For this reason only the following claim is intended to define the invention.

Having thus described my invention, I claim:

An irrigation pipe carrier designed to facilitate manual movement of a length of irrigation pipe having an upright sprinkler standard at the center thereof comprising:

a support bar;

tong means suspended from said support bar at two spaced positions adapted to grip the pipe when said support bar is elevated relative to the pipe;

a bracket fixed to the center of said support bar;

a rack slidably mounted on said bracket for motion perpendicular to the axis of the pipe;

a pawl pivotally mounted on said bracket adapted to engage said rack to thereby prevent motion of said rack relative to the support bar;

and yoke means fixed to said rack adapted to abut the pipe adjacent the sprinkler standard.

References Cited in the file of this patent

UNITED STATES PATENTS

| | | |
|---|---|---|
| 584,903 | Stafford et al. | June 22, 1897 |
| 832,727 | Hampton | Oct. 9, 1906 |
| 905,010 | Simmons | Nov. 24, 1908 |
| 2,692,159 | Croswell et al. | Oct. 19, 1954 |

OTHER REFERENCES

Weilbach, German application 1,003,932, printed March 7, 1957 (KL.35b6/25).